(12) United States Patent
Adolfsson et al.

(10) Patent No.: US 9,286,741 B2
(45) Date of Patent: Mar. 15, 2016

(54) APPARATUS AND METHOD FOR ACCESS CONTROL

(75) Inventors: Johan Adolfsson, Södra Sandby (SE); Willy Sagefalk, Veberöd (SE)

(73) Assignee: AXIS AB, Lund (SE)

( * ) Notice: Subject to any disclaimer, the term of this patent is extended or adjusted under 35 U.S.C. 154(b) by 243 days.

(21) Appl. No.: 13/609,993

(22) Filed: Sep. 11, 2012

(65) Prior Publication Data

US 2013/0093563 A1    Apr. 18, 2013

Related U.S. Application Data

(60) Provisional application No. 61/550,528, filed on Oct. 24, 2011.

(30) Foreign Application Priority Data

Oct. 18, 2011   (EP) .................................... 11185627

(51) Int. Cl.
| | | |
|---|---|---|
| *B60R 25/00* | (2013.01) |
| *G05B 19/00* | (2006.01) |
| *H04Q 9/00* | (2006.01) |
| *H04Q 1/00* | (2006.01) |
| *G05B 23/00* | (2006.01) |
| *G06F 7/00* | (2006.01) |
| *G06F 7/04* | (2006.01) |
| *G06F 17/30* | (2006.01) |
| *G06F 15/16* | (2006.01) |

(Continued)

(52) U.S. Cl.
CPC ........ *G07C 9/00031* (2013.01); *G07C 9/00134* (2013.01); *H04W 12/06* (2013.01); *H04W 12/08* (2013.01); *G06F 21/35* (2013.01); *G07C 9/00087* (2013.01); *G07C 9/00103* (2013.01); *G07C 9/00182* (2013.01);

(Continued)

(58) Field of Classification Search
CPC ........................ G07C 9/00309; G07C 9/00103
USPC .................................................. 340/5.1–5.86
See application file for complete search history.

(56) References Cited

U.S. PATENT DOCUMENTS

| 4,839,640 A | 6/1989 | Ozer et al. |
| 5,682,142 A | 10/1997 | Loosmore et al. |

(Continued)

FOREIGN PATENT DOCUMENTS

| EP | 1837792 A1 | 9/2007 |
| JP | 2004084278 A | * 3/2004 |

(Continued)

OTHER PUBLICATIONS

Paxton product information from company website "AN1063—Configuring anti-passback" Oct. 21, 2010 (pp. 1- 6) www.paxton.co.uk.

(Continued)

*Primary Examiner* — Mohamed Barakat
(74) *Attorney, Agent, or Firm* — Volpe and Koenig, P.C.

(57) ABSTRACT

A method and apparatus for controlling access from a first area to a second area includes receiving an identity signal from an identifier input device, and checking for stored data indicating that the identity represented by the identity signal is registered as present in the first area. If a predetermined access requirement is fulfilled, then a pass signal at the first access controller is generated. To control access from the second area to a third area, an enter message is sent to a second controller with at least the identity and data indicating that the identity is present in an access area of the second controller. An exit message is sent to a third controller controlling access to the first area, including at least the identity and data indicating that the identity is not present in an access area of the third controller.

17 Claims, 3 Drawing Sheets

(51) Int. Cl.

| | | |
|---|---|---|
| *H04M 1/66* | (2006.01) | |
| *H04M 1/68* | (2006.01) | |
| *H04M 3/16* | (2006.01) | |
| *G07C 9/00* | (2006.01) | |
| *H04W 12/06* | (2009.01) | |
| *H04W 12/08* | (2009.01) | |
| *H04L 29/06* | (2006.01) | |
| *G06F 21/35* | (2013.01) | |

(52) U.S. Cl.
CPC ............ *G07C 9/00309* (2013.01); *H04L 63/08* (2013.01); *H04L 63/10* (2013.01); *H04L 63/102* (2013.01); *H04M 2203/6045* (2013.01)

(56) References Cited

U.S. PATENT DOCUMENTS

| | | |
|---|---|---|
| 7,775,429 B2 | 8/2010 | Radicella et al. |
| 2005/0225444 A1 | 10/2005 | Clift et al. |
| 2007/0021197 A1* | 1/2007 | Frerking .................... 463/29 |
| 2008/0290988 A1* | 11/2008 | Crawford .................. 340/5.6 |
| 2009/0050697 A1 | 2/2009 | Sparks et al. |
| 2009/0070571 A1 | 3/2009 | Neely |
| 2009/0243837 A1* | 10/2009 | Chul Lee et al. ............ 340/531 |
| 2010/0045424 A1 | 2/2010 | Kawakita |
| 2010/0150122 A1* | 6/2010 | Berger et al. ............... 370/338 |
| 2012/0218075 A1* | 8/2012 | Hill .......................... 340/5.61 |

FOREIGN PATENT DOCUMENTS

| | | |
|---|---|---|
| JP | 2004287991 A | 10/2004 |
| JP | 2006323453 A | 11/2006 |
| JP | 2010218383 A | 9/2010 |
| WO | 02/054784 A1 | 7/2002 |
| WO | 03/100576 A2 | 12/2003 |

OTHER PUBLICATIONS

CS Technologies product information from company website "Application Note: Antipassback" 2002 (pp. 1-6) www.cstech.biz.

\* cited by examiner

APPARATUS AND METHOD FOR ACCESS CONTROL

CROSS REFERENCE TO RELATED APPLICATIONS

This application claims priority to European Patent Application No. 11185627.4 filed on Oct. 18, 2011 and claims the benefit of U.S. Provisional Application No. 61/550,528, filed on Oct. 24, 2011, which are incorporated by reference as if fully set forth.

FIELD OF INVENTION

The present invention relates to an apparatus and a method for controlling access to specific areas, e.g. controlling access through passages between different areas.

BACKGROUND

Systems for controlling access to specific physical facilities or areas are generally installed to enable control of which individuals that are allowed to enter particular areas or physical facilities. Today many of these access control systems involve the use of an electronically identifiable identity device, e.g. codes, ID-cards, RFID tags, mobile phones, etc., for identification of an individual trying to access an area or physical facility.

However, many of these identity devices, also known as credentials, may be handed over to someone else. In particular, such credentials may be handed to someone else after the first person has passed through a controlled passage using the credentials. Then that person may use the same credentials to enter the same area or another area requiring the credentials.

This problem is addressed in various antipassback concepts. In "Hard" antipassback implementations, the system keeps track of where the user is and access is denied if a user try to pass from one area to another and the user is not registered as present in the area that is to be exited. Similar to a "Hard" antipassback system, a "Soft" antipassback system keeps track of the users, but access is not denied if the user is not registered in the area that is to be exited. In timed antipassback, a user is denied access through a passage for a predetermined time after entry through the passage, so that there is no need for checking if a user exits the area. In global antipassback, the users are tracked throughout several areas. In known solutions implementing global antipassback, a master node or a master controller keeps track of where each user is in the system and all access requests have to be verified with this master. A system like this is very vulnerable as the entire system relies on the master controller and the operational status of the master controller. For example, the system will not work if the master controller is not operating properly.

SUMMARY

An improved access controlling system is described herein.

A method for controlling access from a first area to a second area by means of an access controller is also described.

In particular, according to one embodiment, a method for controlling access from a first area to a second area comprises receiving, at a first access controller, an identity signal from an identifier input device, checking in a storage of the first access controller for data indicating that the identity represented by the identity signal is registered as present in the first area, if the identity is registered as present in the first area then one access criterion is fulfilled, if a predetermined access requirement, which at least require fulfilment of one access criterion, is fulfilled then the following acts are performed: generating a pass signal at the first access controller, sending an enter message to a second controller controlling access from the second area to a third area, the enter message including at least the identity and data indicating that the identity is present in an access area of the second controller, and sending an exit message to a third controller controlling access to the first area, the exit message including at least the identity and data indicating that the identity is not present in an access area of the third controller.

One advantage of having the identity data stored locally in an access controller controlling a passage leading from the area in which the object or person of the identity is present and then, after the object or person has entered into a neighbouring area through the passage, sending the enter message to another access controller controlling passages from the entered area and sending the exit message to yet another access controller controlling passages from the exited area is that the system may be robust in that the system does not need a central master unit controlling all access requests and that the system may continue operate even if parts of the network is down. The solution according to the invention may allow a distribution of the validation of access requests over an entire site.

In a further embodiment, the checking in a local storage of the first access controller is performed by the first access controller and thereby enables distribution of the validation of an access request to the access controller where the access request originates.

In another embodiment, the method further comprises receiving an entering confirmation signal and wherein the sending of an enter message and the sending of an exit message is performed by the first access controller in response to the receipt of the entering confirmation signal. The advantages of these features are that the system becomes more reliable in determining the location of an object or user.

In one embodiment, the enter message identifies the specific access area into which the identity is entering.

In another embodiment, the enter message identifies the sender of the enter message.

According to a further embodiment, the method further comprises changing the registration of the identity to indicate that the identity is present in the second area after the identity has been found to be registered as present in the first area.

In one embodiment, the method further comprises generating a no-pass signal at the first access controller if a predetermined access criterion is not fulfilled.

In a further embodiment, the method further comprises receiving the enter message at the second controller and registering, in response to the receipt of the enter message and in a storage of the second controller, the identity as being present in an access area of the second controller. The advantage of this is that the second controller then may validate an access request without support or instructions from other controllers or central control units and thereby contribute to a more robust system.

In another embodiment, the predetermined access requirement at least require fulfilment of one additional access criterion relating to a specific time period, wherein this criterion is fulfilled if an access attempt including the identity signal is performed within a specific time period.

In yet another embodiment, the predetermined access requirement at least require fulfilment of one additional access criterion relating access levels, wherein this criterion is fulfilled if an access attempt includes an identity signal allowing access to an access level equal to or higher than the access level of a passage being subject for the access attempt.

In a further embodiment, an identity requires at least two-factor authentication.

Moreover, according to another embodiment, the two factors in the two-factor authentication are a code to be keyed in and a hardware identifier.

According to another aspect, an access controller for controlling access from a first area to a second area comprises an identity signal receiver arranged to receive identity signals from an identifier input device, an access criterion checking means (e.g., a processing unit) configured to check if an access criterion is fulfilled, one access criterion being that the identity of the identity signal is registered as being present in the area from where the identity signal is sent, a data storage means (e.g., a memory) configured to store data indicating all identities registered as present in the first area, an access requirement checking means (e.g., a processing unit) configured to check if an access requirement is fulfilled, wherein the access requirement at least includes one access criterion and requires fulfilment of all included access criteria, a pass signal generator configured to generate a pass signal in response to fulfilment of the access requirement, a controller selector configured to select a controller controlling a passage from the second area and to select a controller controlling a passage to the first area, a transmitter configured to transmit an enter message to the selected controller controlling the passage from the second area, the enter message includes at least the identity and data indicating that the identity is present in an access area of the second access controller, and a transmitter configured to transmit an exit message to the selected controller controlling the passage to the first area, the exit message including at least the identity and data indicating that the identity is not present in an access area of the third controller.

The advantage of equipping the access controller with a data storage means configured as mentioned above and having a transmitter for sending enter messages to the second access controller and a transmitter for sending exit messages to the third controller is that an access system including such an access controller may be robust in that the system does not need a central master unit controlling all access requests and that the system may continue operate even if parts of the network is down. The robustness of a system including the access controller according to the invention may at least partly lay in the fact that this access controller makes it possible to operate the entire access system without the use of a central master controller that validates the access requests.

In one embodiment, a no-pass signal generator is configured to generate a no-pass signal if an access criterion is not fulfilled.

In yet another embodiment, the access controller further comprises a receiver configured to receive an enter message, a receiver configured to receive an exit message, and a storage writer configured to adjust data in the data storage means using information from an enter message and using information from an exit message.

A further scope of applicability will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description, with reference to the accompanying drawings, in which.

Further, in the figures like reference characters designate like or corresponding parts throughout the several figures.

DETAILED DESCRIPTION OF THE PREFERRED EMBODIMENTS

Figure 1:
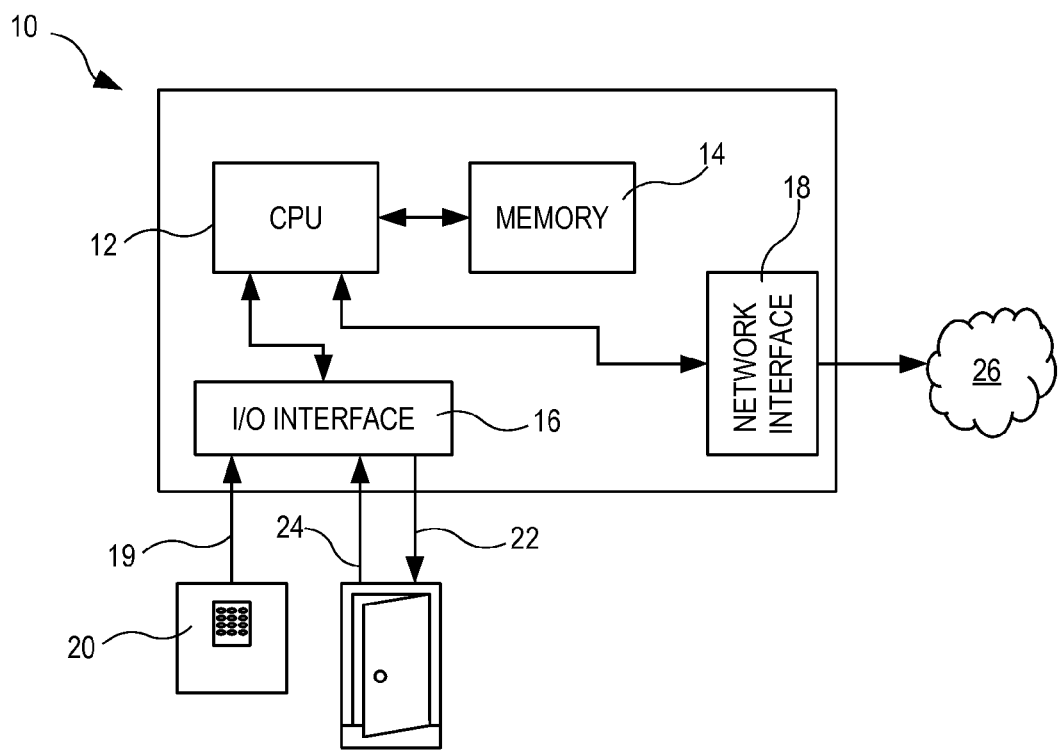
FIG. 1 is a schematic block diagram of an access controller according to one embodiment of the invention.

According to one embodiment of the invention, see FIG. 1, an access controller 10 includes a processing unit 12, e.g., a Central Processing Unit (CPU), arranged to process program code and access related information stored in a memory 14 of the access controller 10 for performing access control in accordance with an access control method. The access control method may for instance be any of the methods presented in this application. Further, the access controller 10 includes an I/O-interface 16 and a network interface 18.

The I/O-interface 16 is arranged to receive identity signals 19 from one or a plurality of identifier input devices 20. The identifier input device 20 may be any type of identity input device, e.g. a key pad for entering an identity code, a card reader, an RFID reader, Near Field Communication receiver (NFC), biometric reader, etc. In addition, the I/O interface 16 is arranged to send a "pass"-signal 22 to a locking device and to receive an entering confirmation signal 24. The locking device is a device arranged to prevent access from one area to another. The entering confirmation signal 24 is a signal indicating that the person or object represented by the identity signal has passed from one area to the other.

The network interface 18 is arranged to enable communication with other access controllers via a network 26, e.g., a Local Area Network (LAN), a Wide Area Network (WAN), the Internet, etc., using a networking technology that is appropriate in view of the environment of the access controller 10 and the access control system or the requirements of the system from a security point of view. Hence, any wired or wireless technology may be considered.

Figure 2:
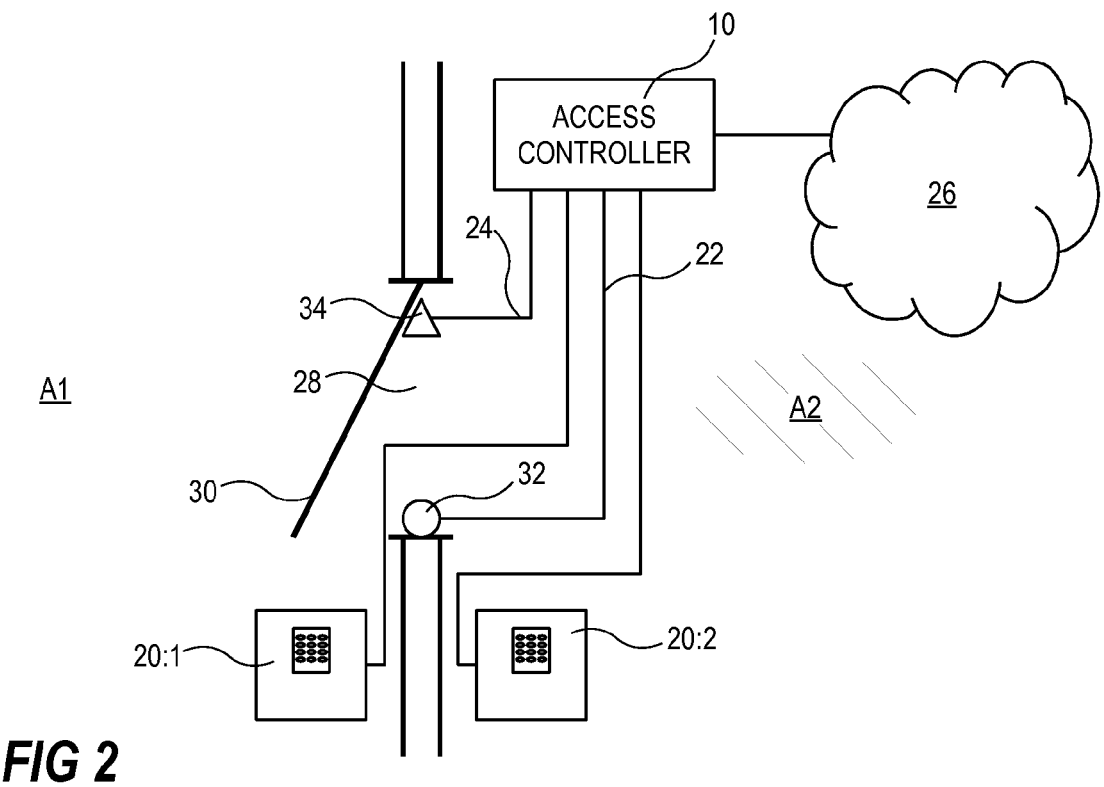
FIG. 2 is a schematic block diagram of a possible environment for an access controller.

In FIG. 2, an access controller 10 according to one embodiment is shown as part of a system for access control according to one aspect. The access controller 10 is arranged to control access between a first area A1 and a second area A2 through a passage 28. The passage 28 may be blocked by a blocking device 30, e.g., a door. A first identifier input device 20:1 is mounted at the passage 28 to be operated from the first area A1 and a second identifier input device 20:2 is mounted at the passage 28 to be operated from the second area A2. The two identifier input devices 20:1-2 are connected to the access controller 10 and each of them is sending an identity signal to the access controller 10 when operated using an identity means and/or an identity code. Further, a locking means 32 is arranged to interact with the blocking device 30 for locking and unlocking, respectively, the blocking device 30 in response to a signal sent from the access controller.

According to one embodiment, the passage 28 is monitored by means of a passage monitoring device 34 in order to detect if an identified person really is passing the passage. The passage monitoring device 34 may be a sensor detecting if the door is opened, a detector detecting passage if a light beam is broken, an infrared sensor, a monitoring camera, etc. The passage monitoring device 34 may generate an entering confirmation signal when passage in connection with a valid access request is performed. The entering confirmation signal may be sent to the access controller 10.

In order to enable control of access to a site having a plurality of access areas and a plurality of doors, the access control system, including the access controller 10, is formed using a plurality of locally arranged access controllers, which are connected via the network 26.

Figure 3:
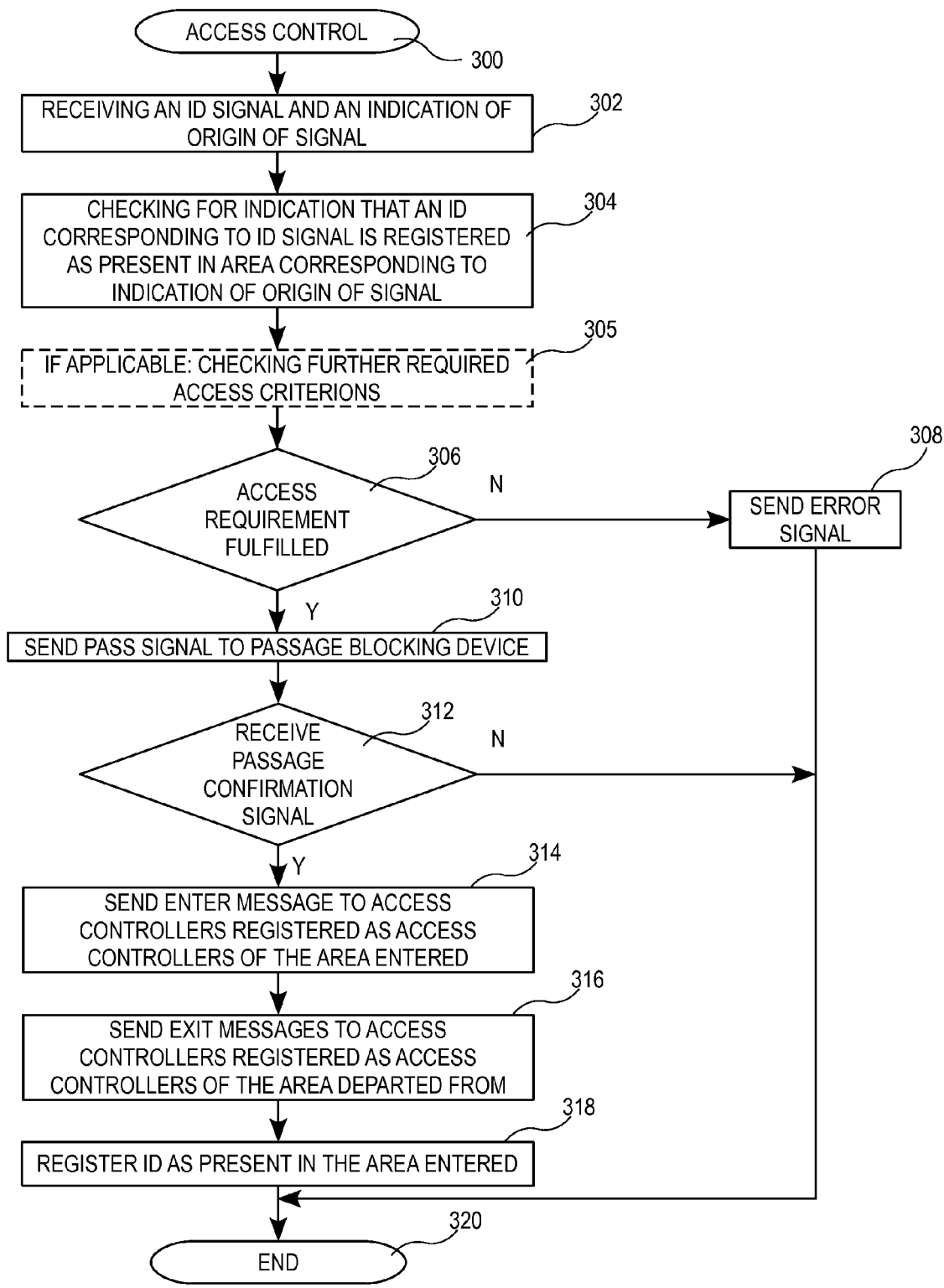
FIG. 3 is a schematic flowchart showing an access control process according to one embodiment of the invention.

Now referring to FIG. 3, an example of a method 300 for controlling access from one area to another is presented. The access control may be performed in the access controller 10. The process is initiated when an identity signal 19 is received at the access controller 10, step 302. The identity signal, hereinafter referred to as ID signal 19, is identified as originating from a specific identification input device 20, thereby also identifying the area from which someone requests access to an area on the other side of the passage 28 controlled by the access controller 10. The ID signal 19 may be seen as a request for accessing the area accessible through the passage 28 controlled by the access controller 10.

The received ID signal 19 is compared to identities registered in the access controller 10 and which are registered as being present in the area from which the request originates, step 304. If no identity corresponding to the identity in the ID signal 19 is found to be registered as being present in the area from which the access request originates, then the checking of 304 results in a non-fulfilled access criterion, i.e., this particular access criterion is not fulfilled. However, if such an identity is found to be registered as being present in the area from which the access request originates then the checking of 304 results in a fulfilled access criterion.

Access to the area accessible through the passage is to be granted if a predetermined access requirement is fulfilled. The predetermined access requirement may require fulfillment of a single access criterion or a combination of a plurality of access criteria. An example of an access requirement based on a single access criterion may be to grant access if a valid code, representing an Identity allowed to pass, is entered. An example of an access requirement based on two access criteria may be to grant access if the valid code is entered and the identity represented by the code is registered as allowed to pass through a passage requiring a specific access level. Another access requirement may correspond to the description of step 304, i.e., that a valid identity and that identity being registered as present at a particular location. Examples of access criteria include entering of a valid code, presenting for the access system a valid hardware identifier, presenting two different identities (e.g., an escort requirement), that the identity represented by an identifier is registered as having at least the required access level, that the time for the access request corresponds to a time period allowed for the identity represented by an identifier, that a combination of a plurality of identifiers confirms the identity.

Identifiers may be a code, biometric, hardware based, etc. For example an identifier may be a numeric code, an alpha numeric code, a symbol based code, etc. Moreover, an identifier may be represented by a finger print, the scan of a retina, etc. An identifier may also be a magnetic card, a RF-ID tag, a barcode, a QR-code, etc.

Hence, if applicable for the particular implementation, the process may be designed to require checking of additional access criteria, step 305.

The access requirement of the present invention may thus include one or a plurality of access criteria. All access criteria included in the access requirement has to be fulfilled in order to fulfill the access requirement. If the access requirement is not fulfilled, step 306, then an error signal is sent to the identifier input device, step 308, and the process of controlling the access of the individual being represented by identity signal is ended, step 320.

However, if access requirement is fulfilled, step 306, then a pass signal is sent, step 310, to a passage blocking device 32, e.g. the lock of a door, and the individual is allowed to pass through.

According to one embodiment, the system is equipped with sensors enable to detect if a person really is passing through the passage, step 312. However, the system does not necessary include such sensors, but may instead include mechanical means arranged so that a person who is allowed through the passage must pass through. Moreover, the system does not need to include any means for checking if a person passes through the passage. If the system does not include any sensor or mechanical means like this, then the process may assume that the person passes the passage and the process continues to step 314.

If the system on the other hand includes the sensor 34 discussed above and if no passage confirmation signal 24 is received then the process is ended, step 320, after a specific time period and no changes of the registers regarding where the person is located are made. However, if a passage confirmation signal 24 is received, the process continues to step 314 where an enter message may be sent to all access controllers that are registered in the present access controller 10 as access controllers of the area that the person has entered by passing the passage, step 314. Further, an exit message may be sent to the access controllers that are registered in the present access controller 10 as access controllers of the area that the person has departed from when passing through the passage, step 316. In addition, the identity may be registered in the present access controller 10 as being present in the entered area, step 318. Then the process is ended, step 320.

According to one embodiment, the addresses of the access controllers to which the enter message is to be sent is retrieved from a memory 14 of the access controller 10 performing the processing. The retrieval may be performed by searching for any access controller stored in the memory 14 as controlling access from the area being the area entered by the person. This embodiment may also have the addresses of the access controllers to which the exit message is to be sent stored in the memory. The retrieval of these addresses may be performed in a similar way by searching for any access controller stored in the memory 14 as controlling access from the exited area.

Alternatively, the enter message includes information of the identity of the area that are entered and the exit message includes information of the identity of the area that are exited.

The enter message and the exit message also includes the identity relating to the person passing through the passage 28. These messages are then broadcasted over the network 26 and any access controller serving the area of one of the messages are responding to the message by either registering the identity of the person entering that area as being present in the area or by either deleting the identity of the person leaving the specific area or registering this identity as not present.

Figure 4:
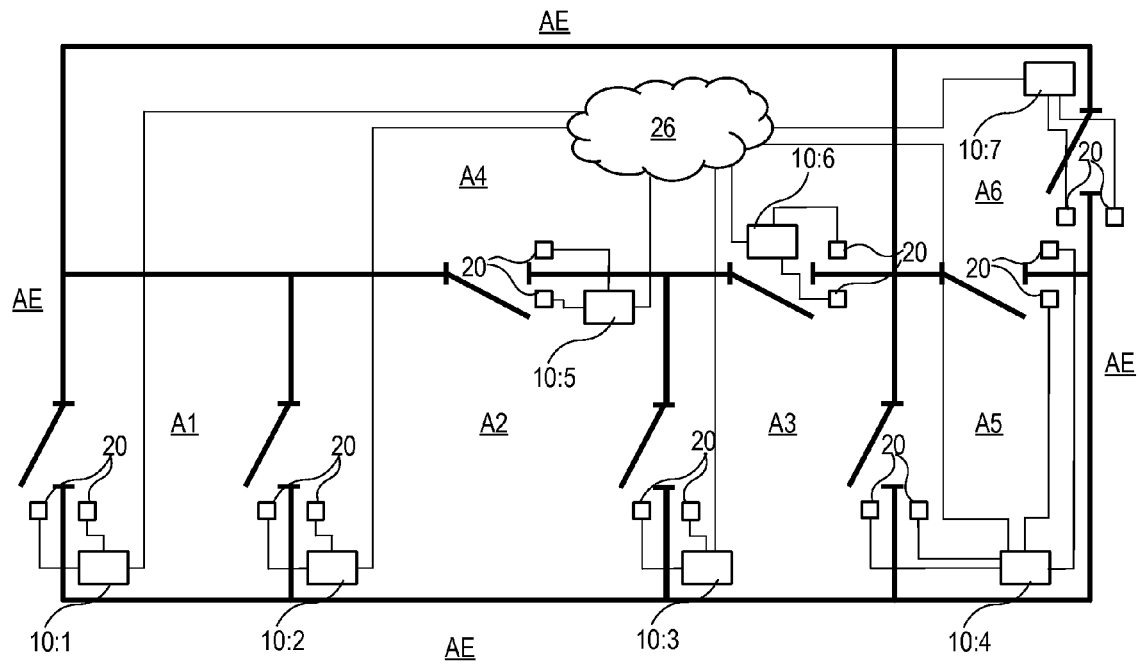
FIG. 4 is a schematic view of a possible arrangement of an access control system according to one embodiment of the invention.

In an alternative embodiment the enter message and the exit message described in the process of FIG. 4 may be represented by a broadcasted message including information at least relating to the area the identity is entering, thereby making all controllers aware of that the specific identity has exited an area for which the identity was previously registered and entered the new area specified in the broadcasted message. Hence, the broadcasted message may be interpreted as a combined enter message and exit message.

FIG. 4 depicts a system of access controllers 10:1-7 controlling the access to a series of different access areas A1-A6. The area outside the areas that are access controlled are referred to as AE, short for Area External, and may be a public area or an area having less or no access control. The plurality of access controllers 10:1-7 are connected via a network 26 and are arranged to transfer data relating to an allowed access. Data indicating such an allowed access is at least transferred to neighboring access controllers, i.e., access controllers that control access to access areas that are neighboring areas to the entered access area. An access controller may be connected to two identifier input devices 20, one on each side of the passage between two areas, e.g., like the connections to access controllers 10:1-3 and 10:5-7. An access controller may be connected to a single input device if the circumstances allow or require that. Further, an access controller may be arranged to handle additional identifier input devices 20, even identifier input devices 20 arranged at different passages. See, for instance, the access controller 10:4, which is connected to identifier input devices at the passage between areas A5-A3 and to identifier input devices at the passage between areas A5-A6.

Figure 5:
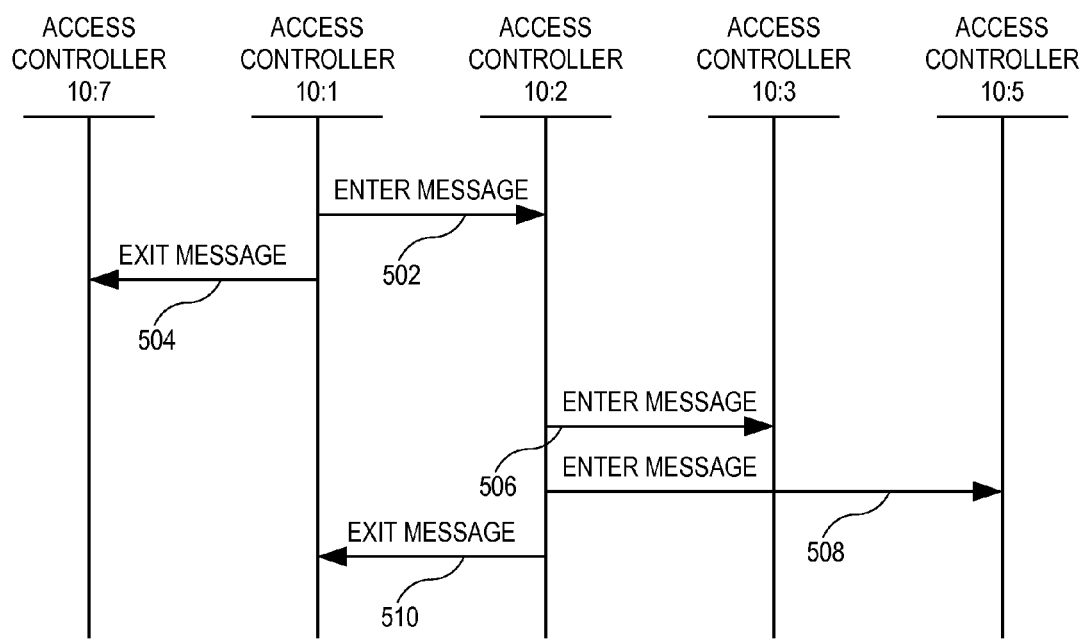
FIG. 5 is a timing diagram showing the sending of messages between access controllers in one use scenario applied to the arrangement described in FIG. 4.

In order to facilitate the understanding of the described embodiments, a couple of example scenarios relating to possible embodiments of the invention are described below in relation to FIG. 4 and FIG. 5. Assume that a person having an identifying means relevant for the system is present in the external area AE. Then the access controllers 10:1 and 10:7, which both control passages to/from the external areas, may include data identifying that the person, or at least the identifying means of the person, is present in the external area AE. Herein, after the description relating to FIG. 4 will refer to the identifying means or person as the person in order to make the description more comprehensible. The rest of the controllers 10:2-6 may include data indentifying that the person is not present in any area in which a passage controlled by that specific access controller 10:2-6 is directly reachable. Hence, the person should not be able to try to access a passage relating to any one of these access controllers. This state may alternatively be indicated by not having any information relating to the person in these access controllers.

The person approaching the passage between the external area AE and the area A1 may identify himself using the identifier input device 20 in the external area AE. The identifier of the person is present in the access controller 10:1 and may indicate that the person is supposed to be in the area AE. The access request from the person is thus correct and the access controller opens the passage for the person to enter area A1. The passage may be equipped with sensors and or other means confirming that the person has passed through the passage. When the person has entered area A1, confirmed or unconfirmed, the access controller 10:1 may register the person as being present in area A1, may send an enter message 502 to access controller 10:2, and may send an exit message 504 to access controller 10:7. Thereby the person that has entered area A1 is only able to access another area via access controller 10:1 or 10:2 and, thus, the identifier means of the person may not be passed over to a person in area AE for accessing area A1 or area A6.

If the person continues to area A2 via the passage controlled by access controller 10:2 by identifying himself at the passage, then the access controller 10:2, which is controlling the identifier input devices 20 at this passage, may send an enter message 506 to access controller 10:5 and an enter message 508 to access controller 10:3, both controlling passages from area A2. The access controller 10:2 may also send an exit message 510 to access controller 10:1. Moreover, the access controller 10:2 may internally set the person as being present in area A2. Thereby, the access controllers 10:2, 10:3, and 10:5, which all control access from area A2 all have information making it possible to process access controls requested by the user. Moreover, the access controller 10:1, may be adjusted so that it is unable to accept an access request from the person, as the person has left the areas relating to the passage it is controlling.

Assume that area A4 has windows towards area AE and the person is able to give the identifier means (e.g., a card) to a person in area AE. If the person in area AE then tries to pass into area A1, the access controller 10:1 has information indicating that the person of that particular identity is not present in area AE and that the person therefore will not be able to pass into area A1.

Now referring to FIG. 4, another possible scenario is described in which the person is present in area A6 and is inputting an identifier at the identifier input device 20 that is present in area A6 and is connected to access controller 10:4 for controlling the passage between area A6 and area A5. The person may be registered in access controller 10:4 as being present in area A6 and therefore the person may be allowed to pass through the passage to area A5. The access controller 10:4 controls all passages out from area A5, and the identifier input devices 20 positioned at the only two passages from area A5 may all be controlled by access controller 10:4. Therefore, no enter message is sent to other access controllers, but an exit message may be sent to access controller 10:7 and the person is relabeled in access controller 10:4 as being present in area A5.

The scheme of sending entering messages and exit messages between the different access controllers contributes to the advantages of the system, e.g. scalability, pass back protection, etc.

The invention claimed is:

1. A method for controlling access from a first area to a second area, the method comprising:
    receiving, at a first access controller controlling access from the first area to the second area, an identity signal from an identifier input device;
    checking, in a memory of the first access controller, for data indicating that an identity represented by the identity signal is registered as present in the first area;
    if the identity is registered as present in the first area, then determining that one access criterion is fulfilled;
    determining a predetermined access requirement is fulfilled, responsive to at least fulfilment of said one access criterion, to then perform the following acts:
    generating a pass signal at the first access controller granting passage from the first area to the second area;

sending an enter message from the first access controller to a second access controller controlling access from the second area, the enter message including at least the identity and data indicating that an entity associated with the identity is present in the second area, wherein the enter message identifies an access area into which the entity associated with the identity is about to enter; and sending an exit message from the first access controller to a third access controller controlling access to the first area, the exit message including at least the identity and data indicating that the entity associated with the identity is not present in the first area, wherein the enter message and the exit message are separate messages; and wherein the first access controller, the second access controller and the third access controller are connected in a distributed, non-centralized network.

2. The method according to claim 1, wherein the checking in the memory of the first access controller is performed by the first access controller.

3. The method according to claim 1, wherein the method further comprises receiving an entering confirmation signal and wherein the sending of the enter message and the sending of the exit message is performed by the first access controller in response to the receipt of the entering confirmation signal.

4. The method according to claim 1, wherein in response to the enter message the identity is registered at the second access controller and in response to the exit message the identity is deleted from the third access controller.

5. The method according to claim 1, wherein the enter message identifies a sender of the enter message.

6. The method according to claim 1, further comprising changing the registration of the identity to indicate that the identity is present in the second area after the identity has been found to be registered as present in the first area.

7. The method according to claim 1, further comprising generating a no pass signal at the first access controller if the predetermined access requirement is not fulfilled.

8. The method according to claim 1, further comprising receiving the enter message at the second access controller and registering, in response to the receipt of the enter message in a storage of the second access controller, the identity as being present in the second area.

9. The method according to claim 1, wherein the predetermined access requirement at least require fulfilment of one additional access criterion relating to a specific time period, wherein this criterion is fulfilled if an access attempt including the identity signal is performed within the specific time period.

10. The method according to claim 1, wherein the predetermined access requirement at least require fulfilment of one additional access criterion, wherein this criterion is fulfilled if an access attempt includes an identity signal allowing access to an access level equal to or higher than the access level of a passage being subject for the access attempt.

11. The method according to claim 1, wherein the identity requires at least two-factor authentication.

12. The method according to claim 11, wherein the two factors in the two-factor authentication is a code to be keyed in and a hardware identifier.

13. An access controller for controlling access from a first area to a second area, the access controller comprising:
an identity signal receiver arranged to receive identity signals from an identifier input device;
a processing unit configured to check if an access criterion is fulfilled, one access criterion being that an identity represented by identity signal is registered as being present in an area from where the identity signal is sent;
a memory configured to store data indicating all identities registered as present in the first area;
a pass signal generator configured to generate a pass signal in response to fulfilment of the access criterion;
a controller selector configured to select a second access controller controlling a passage from the second area to a third area and to select a third access controller controlling a passage to the first area;
an enter message transmitter configured to transmit an enter message to the selected second access controller controlling the passage from the second area, the enter message includes at least the identity and data indicating that an entity associated with the identity is present in the second area; and
an exit message transmitter configured to transmit an exit message to the selected third access controller controlling the passage to the first area, the exit message including at least the identity and data indicating that the entity associated with the identity is not present in the first area,
wherein the enter message and the exit message are separate messages.

14. The access controller according to claim 13, further comprising a no-pass signal generator configured to generate a no-pass signal if the access criterion is not fulfilled.

15. The access controller according to claim 13, further comprising:
an enter message receiver configured to receive the enter message;
an exit message receiver configured to receive the exit message; and
a storage writer configured to adjust data in the memory using information from the received enter message and using information from the received exit message.

16. A method for controlling access from a first area to a second area, the method comprising:
receiving, at a first access controller controlling access from the first area to the second area, an identity signal from an identifier input device;
checking, in a memory of the first access controller, for data indicating that an identity represented by the identity signal is registered as present in the first area;
if the identity is registered as present in the first area, then determining that one access criterion is fulfilled;
determining a predetermined access requirement is fulfilled, responsive to at least fulfilment of said one access criterion, to then perform the following acts:
generating a pass signal at the first access controller granting passage from the first area to the second area;
retrieving, in the memory of the first access controller, an address of a second access controller controlling access from the second area;
sending an enter message to the second access controller controlling access from the second area, the enter message including at least the identity and data indicating that an entity associated with the identity is present in the second area;
retrieving, in the memory of the first access controller, an address of a third access controller controlling access to the first area; and
sending an exit message to the third access controller controlling access to the first area, the exit message including at least the identity and data indicating that the entity associated with the identity is not present in the first area,
wherein the enter message and the exit message are separate messages.

17. An access controller for controlling access from a first area to a second area, the access controller comprising:
- an identity signal receiver arranged to receive identity signals from an identifier input device;
- a processing unit configured to check if an access criterion is fulfilled, one access criterion being that an identity represent by identity signal is registered as being present in an area from where the identity signal is sent;
- a memory configured to store data indicating all identities registered as present in the first area;
- a pass signal generator configured to generate a pass signal in response to fulfilment of the access criterion;
- a controller selector configured to select a second access controller controlling a passage from the second area to a third area and to select a third access controller controlling a passage to the first area, the controller selector is further configured to retrieve, in the memory of the access controller, an address of the second access controller controlling the passage from the second area to the third area and an address of the third access controller controlling the passage to the first area;
- an enter message transmitter configured to transmit an enter message to the selected second access controller controlling the passage from the second area to the third area, the enter message includes at least the identity and data indicating that an entity associated with the identity is present in the second area; and
- an exit message transmitter configured to transmit an exit message to the selected third access controller controlling the passage to the first area, the exit message including at least the identity and data indicating that the entity associated with the identity is not present in the first area,
- wherein the enter message and the exit message are separate messages.

* * * * *